Oct. 17, 1939. K. J. TOBIN ET AL Re. 21,238
CAR DOOR
Original Filed May 20, 1933 4 Sheets-Sheet 1
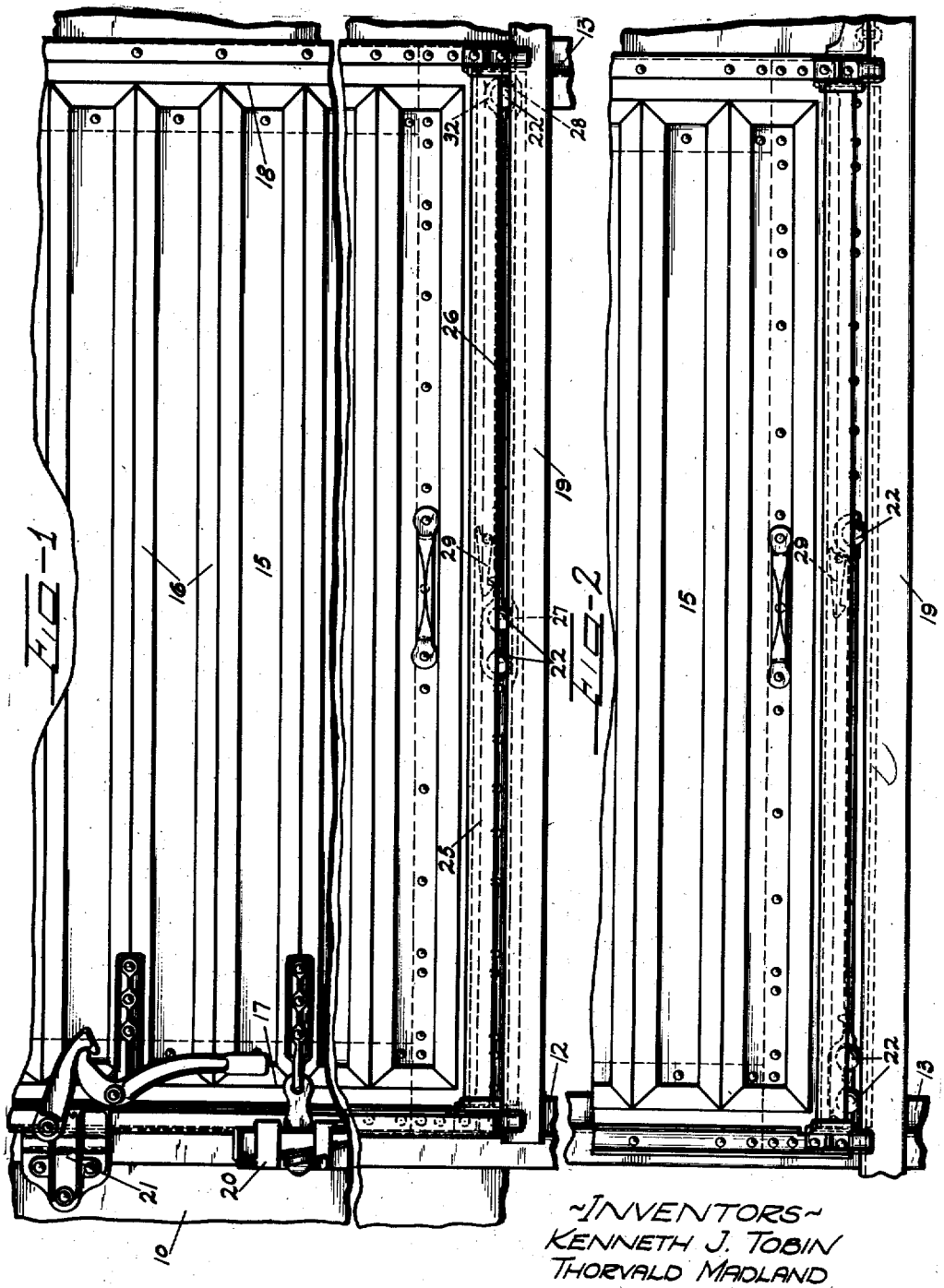
~INVENTORS~
KENNETH J. TOBIN
THORVALD MADLAND
By~ Samuel Reese
ATTY.

Oct. 17, 1939. K. J. TOBIN ET AL Re. 21,238

CAR DOOR

Original Filed May 20, 1933 4 Sheets-Sheet 2

~INVENTORS~
KENNETH J. TOBIN
THORVALD MADLAND
By~ Samuel Reese
ATTY.

Oct. 17, 1939. K. J. TOBIN ET AL Re. 21,238

CAR DOOR

Original Filed May 20, 1933 4 Sheets-Sheet 3

INVENTORS
KENNETH J. TOBIN
THORVALD MADLAND

By Samuel Reese
ATTY.

Oct. 17, 1939. K. J. TOBIN ET AL Re. 21,238
CAR DOOR
Original Filed May 20, 1933 4 Sheets-Sheet 4
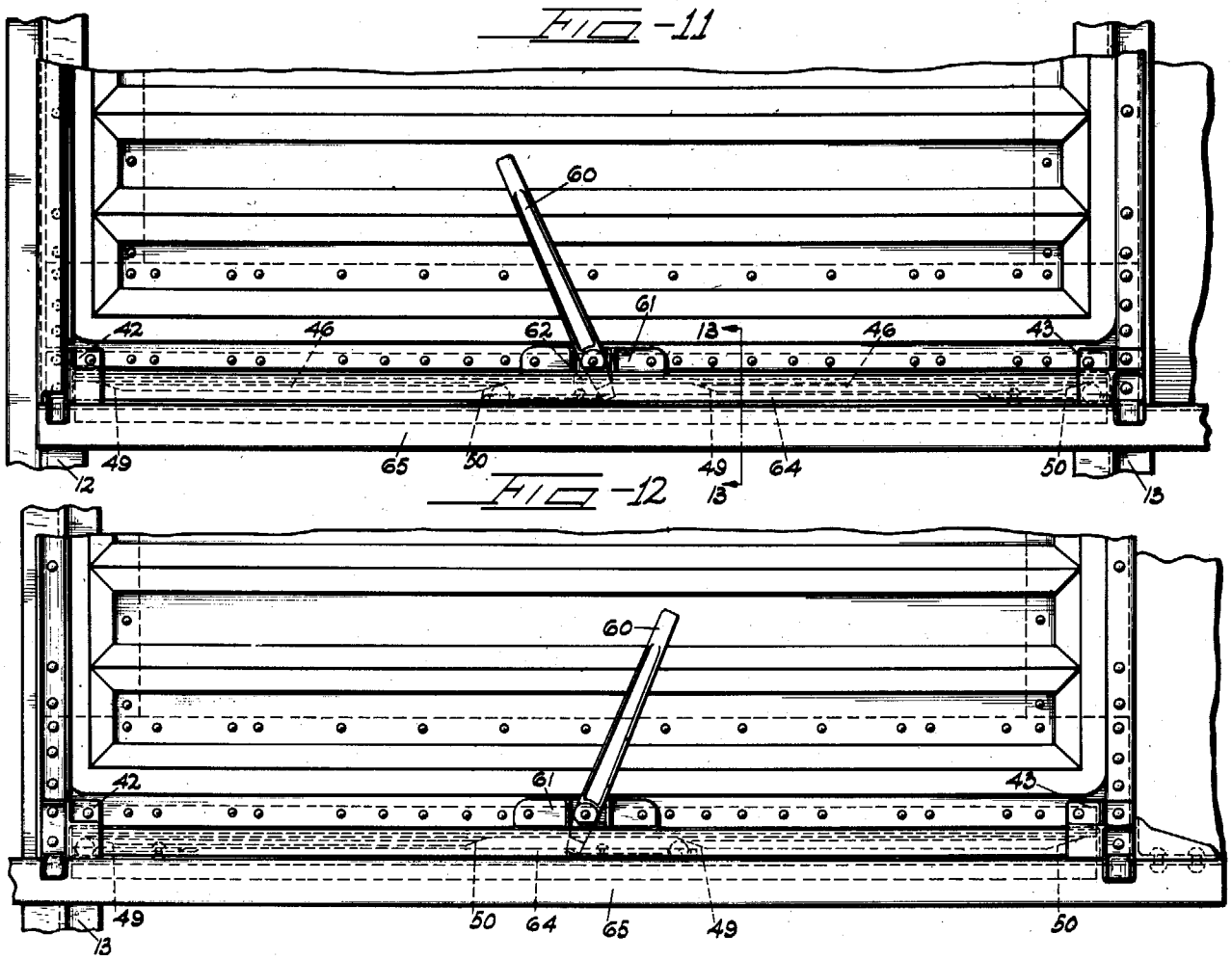
~INVENTORS~
KENNETH J. TOBIN
THORVALD MADLAND
By~ Samuel Reese
ATTY.

Reissued Oct. 17, 1939

Re. 21,238

UNITED STATES PATENT OFFICE 21,238

CAR DOOR

Kenneth J. Tobin and Thorvald Madland, Chicago, Ill., assignors, by mesne assignments, to The Youngstown Steel Door Company, Cleveland, Ohio, a corporation of Ohio Original No. 2,027,566, dated January 14, 1936, Serial No. 671,972, May 20, 1933. Application for reissue December 10, 1937. Serial No. 179,180

33 Claims. (Cl. 20—22)

This invention relates to doors and concerns itself primarily with sliding doors for railway house cars.

It is an object of this invention to provide sliding doors which shall be frictionally supported in closed position and capable of unimpeded movement between closed and full open positions to fully expose the door opening controlled by said door.

A further object is to provide sliding car doors capable of support by antifriction means having relative movement with respect to said doors upon tracks for uninterrupted movement to full open and closed positions, the tracks having indentures adapted to receive the antifriction means in the closed position of the door, whereby the door is frictionally supported upon said tracks.

A further object is to provide sliding car doors frictionally supported in closed position upon tracks having indentures for receiving relatively movable antifriction means for the doors, said doors being constructed whereby the initial opening movement thereof will urge the anti-friction means out of the indentures and into door supporting position upon said tracks.

A further object is to provide sliding car doors frictionally supported in closed and full open positions upon tracks having indentures for receiving relatively movable antifriction supporting means for the doors, said doors being constructed whereby the initial opening and closing movements thereof will urge the antifriction means out of the indentures and into door supporting position upon said tracks, said doors in full open position completely exposing the door openings controlled thereby.

A further object is to provide sliding car doors frictionally supported in closed and full open positions upon tracks and capable of travel between said positions upon relatively movable antifriction means, said doors carrying levers adapted to impart movement to said means to effect release of the frictional engagement and to dispose the doors upon and in peripheral engagement with said means.

A further object is to provide sliding doors frictionally supported in closed and full open positions upon tracks, the doors comprising members adapted to have peripheral engagement upon relatively movable spaced balls during travel between said positions, said doors carrying levers adapted to extend through said members and exert a thrust upon a ball spacer for imparting movement to the balls to effect release of the frictional engagement and to dispose the doors upon the balls.

Other objects of the invention will become clear as the description thereof proceeds.

In the drawings forming part of this specification:

Figure 1 is a fragmentary elevation of a sliding car door embodying one form of the invention, the door being illustrated in closed position;

Figure 2 is a view similar to Figure 1, showing the door in full open position;

Figure 11 is a partial elevation illustrating a sliding car door embodying another form of the invention, the door being shown in closed position;

Figure 12 is a view similar to Figure 11, showing the door in full open position.

Figure 3:
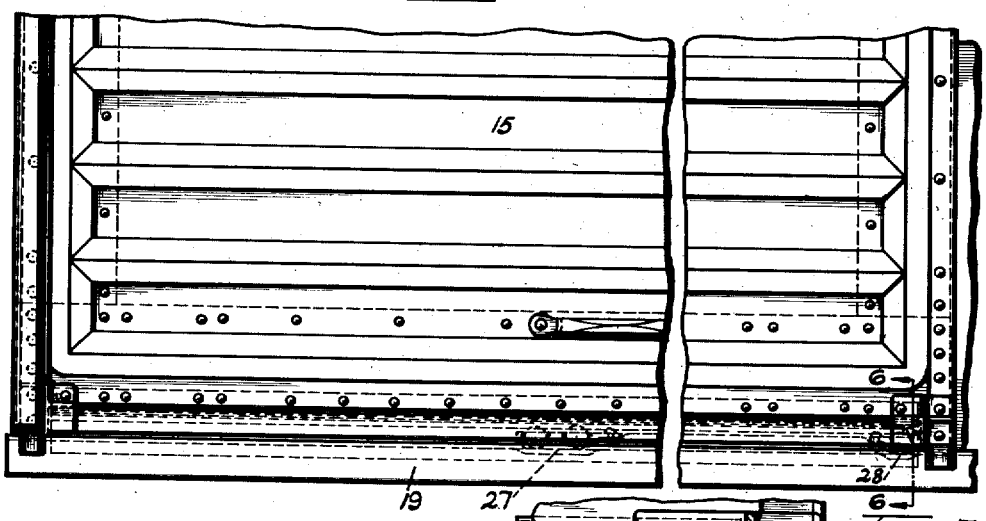
Figure 3 is a fragmentary elevation of a sliding car door embodying another form of the invention.
Figure 4:
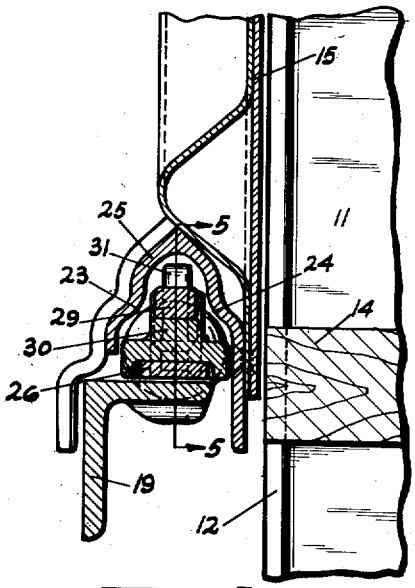
Figure 4 is a vertical section on an enlarged scale.

Referring to the drawings and to the form of the invention illustrated in Figures 1, 2, 4 and 5, there is shown a portion of a side wall designated by the numeral 10 of a railway house car. Said side wall is provided with a door opening 11 defined in part by the front door post 12, the rear door post 13 and the floor 14. The door opening 11 is adapted to be closed by means of a sliding door 15 which, as illustrated, is preferably constructed of metal and may include the horizontal corrugations 16 which at their ends merge into vertical corrugations 17 and 18 situated inwardly of the vertical edges of the door. The door is adapted to be maintained upon the car side by means of a track 19 situated below the door opening and carried upon the car in any desired manner. In its closed position the door is adapted to be locked by means of the mechanism indicated generally by the reference numeral 20. An opening and closing arrangement designated as a whole by the reference numeral 21, may be utilized to impart initial opening movement and final closing movement to the door.

To facilitate movement of the door upon the tracks between closed and full open positions a plurality of antifriction means preferably in the form of balls 22 may be utilized. These balls are disposed upon the track and are adapted to support the door during its travel by engagement with shoulders 23 and 24 provided on the member 25 secured to the lower horizontal margin of the door. It will be apparent that during the travel of the door upon the track the balls 22 will have relative movement with respect to the track and to the door. It is desirable that the balls be maintained in definite spaced relationship in order to properly support the door and for this purpose a ball spacer 26 is utilized.

With reference to Figure 1 of the drawings it will be apparent that the door in its closed position is disposed upon the track so as to have frictional engagement therewith. To this end the track 19 is provided with indentures 27 and 28. In the closed position of the door as shown in Figure 1 of the drawings, these indentures are adapted to receive the balls 22 whereby the door may come into frictional engagement with the track.

Figure 5:
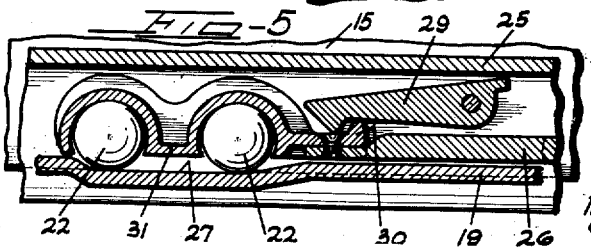
Figure 5 is a partial vertical section taken on line 5—5 of Figure 4.

In view of the relatively movable association between the balls 22 and the door and track it is preferred to provide a mechanism to insure disposition of said balls upon the track for supporting relationship to the door. A pivoted hook member 29 is carried by the member 25. In the closed position of the door, as best illustrated in Figure 5 of the drawings, the hook member 29 has interengagement with an upstanding lug 30 provided on the ball spacer 26. It is to be observed from Figures 1 and 5 that the spacer 26 comprises preferably end portions 31 and 32 adapted to be supported upon the balls 22.

The engagement between the hook member 29 and the upstanding lug 30 occurs in the closed position of the door when said door is frictionally supported upon the track and the balls 22 are, consequently, received within the track indentures 27 and 28. In order to move the door to open position the opening and closing mechanism 21 is actuated and the door moved along the track. Inasmuch as the hook member 29 is carried by the door it will move with the door relative to the track and exert a pull upon the ball spacer 26 through its engagement with the lug 30 so as to impart corresponding movement to the balls 22. The balls and spacer are readily movable since the balls are free of the weight of the door which at this time is carried by the track. In this initial opening movement of the door certain of the balls will move upwardly by virtue of the inclined portions of the indentures until they are engaged by the shoulders 23 and 24 formed on member 25. At this point in the initial opening movement of the door the balls are still in the indentures and in engagement with the member 25 while the door is frictionally supported upon the track. The door then, by its continued movement, imparts movement to the rollers to which the support of the door is transferred as the rollers continue their upward movement out of the indentures. The remainder of the opening movement of the door may then easily be accomplished. During the initial part of the antifrictional movement of the door the hook member 29 will be disengaged from the lug 30, this disengagement being aided by the taper provided on the engaging faces of the hook and the lug. From the nature of the support of the door upon the balls which now carry the weight of the door it will be apparent that the door and, hence, the hook member 29 will travel faster than the balls and, consequently, faster than the ball spacer which carries the lug 30. This difference in the speed of travel of the hook and the lug will effect release of the hook from the lug, the tapered faces on these members assisting such release. During movement of the door to closed position the hook member 29 will overtake the lug 30 which will cause said member to swing about its pivot and fall into engagement with said lug.

It is desirable that the door in its movement between closed and full open positions have unimpeded movement. This feature is obtained in the instant embodiment of the invention by utilization of a pair of balls disposed substantially centrally of the door when the latter is in its closed position and one ball positioned adjacent the rear vertical edge of the door. It will be noted that the indenture 28 is of such size as to receive the single ball whereas the indenture 27 is capable of receiving the pair of balls. In the movement of the door to its full open position the pair of balls 22 travel over that portion of the track provided with the indenture 28. It will be apparent, however, that when either of the pair of balls is positioned in or above the indenture 28 the other of said balls will be upon the track in effective relationship with the door to support the latter so that the indenture 28 does not interfere with the uninterrupted movement of the door. Similarly, the door in its closing movement will have smooth unimpeded movement.

Figure 7:
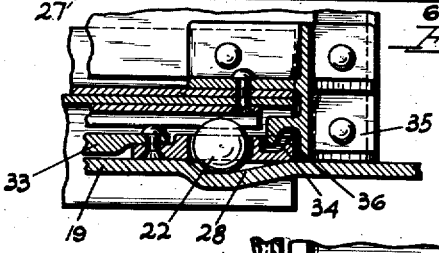
Figure 7 is a vertical section taken on line 7—7 of Figure 6.
Figure 6:
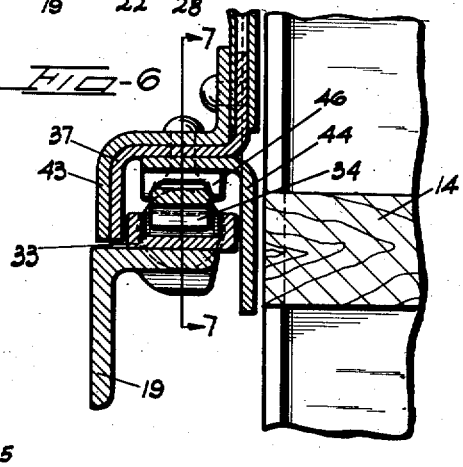
Figure 6 is a vertical section on an enlarged scale taken on line 6—6 of Figure 3.

A somewhat modified form of the invention is illustrated in Figures 3, 6 and 7 of the drawings. A ball spacer 33 utilized in this form of the invention to properly space the balls 22 is supported by the track rather than by the balls. In view of this mode of support of the ball spacer the pivoted hook member 29 may be dispensed with and in its place a rigid hook member 34, formed preferably as an integral portion of the corner casting 35, may be utilized. As illustrated in Figure 7 of the drawings the hook member 34 is adapted to have interengagement with an upstanding lug 36 provided on the ball spacer 33.

It will be manifest that movement of the door from its closed position toward open position will, by the engagement between the hook member 34 and the lug 36, impart corresponding movement to the spacer 33 and the balls 22 in order to cause said balls to move upwardly into engagement with said door. Continued movement of said door will effect movement of said balls and transference of the support of the door from the track to the balls, the latter thus rising out of the indentures and being disposed upon the track with the door resting upon the balls. In view of the fact that the spacer is supported upon the track elevation of the door will effect disengagement between the hook member 34 and the lug 36 so that the door may then be moved to its full open position. It will be clear without further description that the door embodying the instant form of the invention will also have uninterrupted movement between closed and full open positions.

In the former embodiments of the invention the doors in their full open position are disposed upon the balls. In the embodiment of the invention illustrated in Figures 8, 9 and 10, however, the door is supported frictionally upon the track not only in the closed position thereof but in the full open position as well. As in the form of the invention described immediately above, a Z shaped member 37 is secured to the lower horizontal margin of the door. This member is disposed with its web 38 extending outwardly from the door and lying in a substantially horizontal plane. The flanges 39 and 40 of said member extend vertically in opposite directions, the member being secured to the door as by means of rivets 41 extending through the vertical flange 40. The ends of the Z shaped member 37 are adapted to be closed by corner castings 42 and 43. An angle member 44 is secured to the underside of the web of the Z-bar 37 and one leg 45 thereof is adapted to extend downwardly between the car and the track 19 so as to prevent disengagement of the lower portion of the door from the track by outward movement of the door and to provide, together with the vertical flange 39 of the Z-bar 37, a longitudinally extending pocket for the reception of the supporting balls 22. A channel member 46 is secured to the member 44 so that the flanges 47 and 48 thereof extend downwardly into peripheral engagement with the balls 22. The channel member 46 is preferably continuous between the castings 42 and 43 and is deformed at its ends. These deformations preferably take the form of inclined copes 49 and 50. The track 19 is provided with an indenture 51 positioned intermediate the vertical edges of the door when said door is in closed position and with an indenture 52 positioned intermediate the vertical edges of the door when the door is in full open position.

Figure 8:
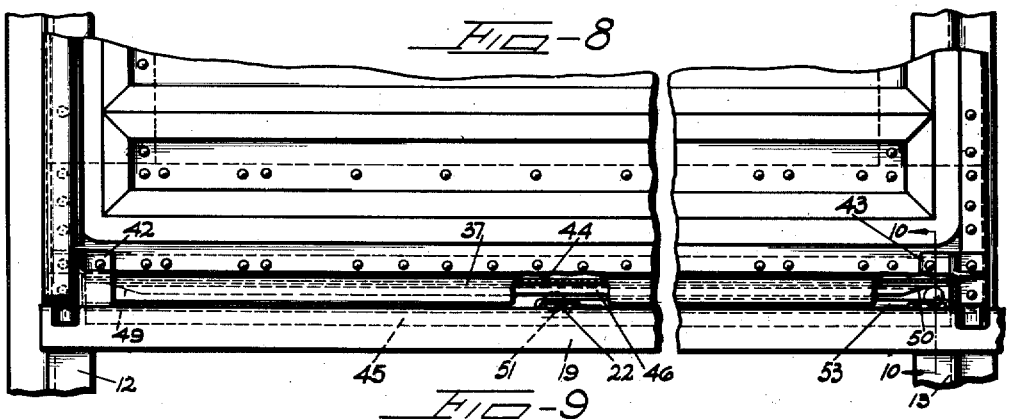
Figure 8 is a fragmentary elevation of a sliding car door embodying a further form of the invention, the door being illustrated in closed position.

The door is shown in its closed position in Figure 8 of the drawings. In this position the forward ball 22 is disposed within the track indenture 51 and the rear ball is disposed adjacent to the inclined portion 50 of the channel member 46. With this disposition of the parts referred to the door is in frictional engagement with the track. To move the door to open position the opening and closing arrangement 21 illustrated in Figure 1 of the drawings may be utilized to impart initial opening movement to the door. This initial movement of the door will in turn impart movement to the balls which act substantially simultaneously, because of the ball spacer 53. The inclined portion at the rear end of the channel member 46 will facilitate upward movement of the door and disposition of the flanges 47 and 48 of the channel member upon the balls. The forward rolling movement of the rear ball will, through the agency of the spacer, impart movement to the forward ball so as to urge said ball out of the track indenture 51 and into corresponding peripheral engagement with the flanges 47 and 48 of the channel member. When the door has been disposed upon the balls said door may readily be moved to the full open position shown in Figure 9 of the drawings. In this position of the door the forward ball will lie adjacent the inclined portion at the forward end of the channel member 46 while the rear ball will be received within the track indenture 52 so that the door may be frictionally supported upon the track. It will be manifest that by the construction of the channel member 46 at the ends thereof and the relationship thereof with the track indentures 51 and 52 free movement of the door will be had without impedance by the track indentures.

Figure 9:
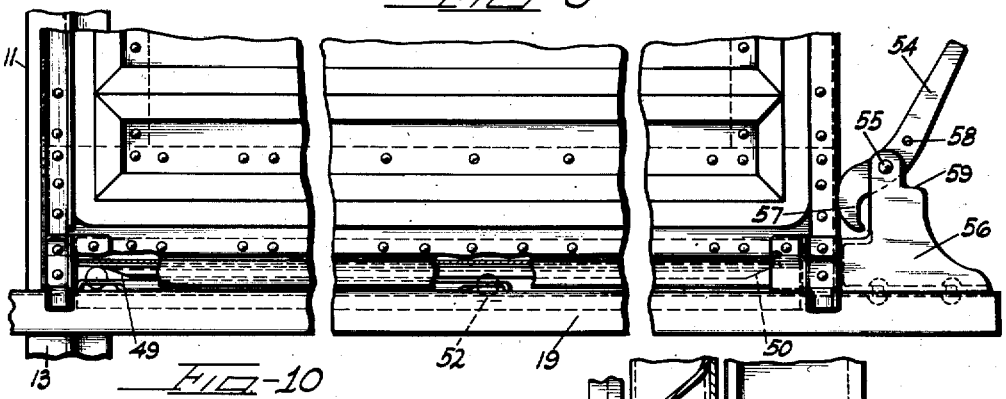
Figure 9 is a view similar to Figure 8 illustrating the door in full open position.
Figure 10:
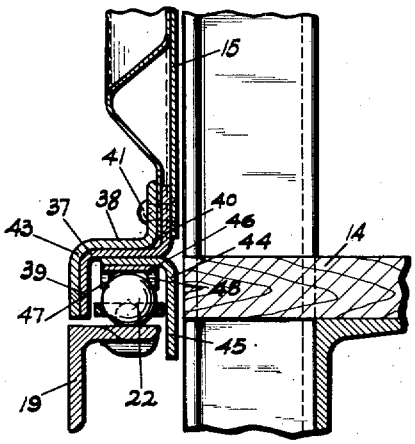
Figure 10 is a vertical section on an enlarged scale taken on line 10—10 of Figure 8.

To impart initial closing movement to the door the mechanism shown in Figure 9 of the drawings may be utilized. This mechanism comprises a lever 54 pivoted intermediate its ends as indicated at 55 upon a door stop 56 which may be secured to the track 19. The lever 54 is provided with a cam portion 57 lying in the path of opening movement of the door. As the door approaches its full open position it will engage the cam portion 57 and swing the lever 54 into the position shown in Figure 9 of the drawings where it is ready for actuation to move the door toward closed position. A lug 58 adapted to engage a shoulder 59 provided on the door stop 56 maintains the lever 54 in such position that the action of the door will dispose the lever as illustrated. It will be observed from Figure 9 of the drawings that while the door of the instant embodiment of the invention is in its full open position the door opening 11 is completely exposed.

Figure 13:
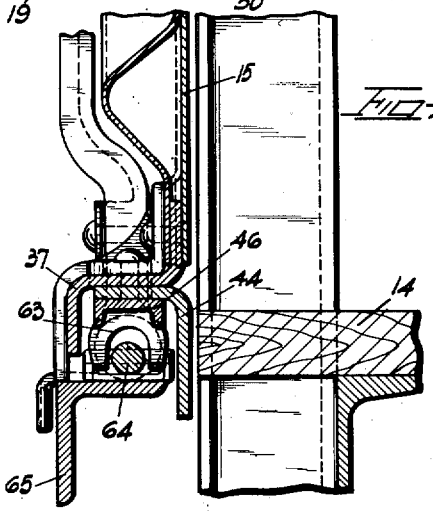
Figure 13 is a vertical section on an enlarged scale taken on line 13—13 of Figure 11.

A further form of the invention in which the door is frictionally supported upon the track in closed and full open positions is illustrated in Figures 11, 12 and 13 of the drawings. As in the two foregoing embodiments the door comprises the Z shaped member 37 secured to the lower horizontal margin of the door, the angle member 44 secured to said Z shaped member and the channel member 46, the depending flanges of which are adapted to be disposed in peripheral engagement with the balls 22. While the channel member 46 may be a continuous member as in the previous embodiment of the invention it is preferred that separate members be utilized, each of said members being provided with inclined ends 49 and 50. A lever 60 pivotally supported upon a bracket 61 secured to the door extends through an opening 62 formed in the Z-bar 37 and angle member 44 intermediate the adjacent ends of the channel members 46. This end of the lever 60 may be bifurcated as indicated at 63 so as to straddle a portion of the spacer 64 which maintains the supporting balls 22 in spaced relationship and engage another portion of said spacer in order to impart movement thereto and to said balls. In this form of the invention it is to be observed that the track 65 is not provided with any indentures.

To move the door from its closed position shown in Figure 11 of the drawings the lever 60 is grasped and swung in a clockwise direction. The swinging movement of the lever imparts a thrust upon the ball spacer which in turn forces the balls from their position adjacent the inclined ends 50 of the channel members 46 to peripheral engagement with the flanges of said channel so as to release the frictional engagement of the door and the track and to dispose said door upon the balls. The door may then be moved to the full open position illustrated in Figure 12 of the drawings in order to completely expose the door opening. As shown in this figure of the drawings the balls have now assumed a position adjacent the inclined ends 49 of the channel members 46 and the door is again supported frictionally upon the track. To move the door to its closed position again the lever 60 is swung in a counter-clockwise direction in order to dispose the door upon the balls 22 so that the door may be moved easily to said position. It will be observed that the movement of the door between closed and full open positions is unimpeded and that in said positions the door is frictionally supported upon the track.

It is apparent that numerous changes and modifications in the details of the invention will be clear to those skilled in the art. It is intended, therefore, that all such modifications and changes be comprehended within this invention, which is to be limited only by the scope of the claims appended hereto.

We claim:

1. In combination, a door having the normal width corresponding to the door opening controlled by said door, a runway provided on said door, the length of said runway being not greater than the width of said door, a track, spaced rolling means disposed upon said track for longitudinal movement relative to said door and track and adapted to engage said runway and support said door for movement upon said track, said door being frictionally supported upon said track in closed position and capable of unimpeded movement upon said rolling means to full open position to completely expose the door opening controlled by said door.

2. In combination, a door having the normal width corresponding to the door opening controlled by said door, a runway provided on said door, the length of said runway being not greater than the width of said door, a track, spaced rolling means disposed upon said track for longitudinal movement relative to said door and track and adapted to engage said runway and support said door for movement upon said track, spaced indentures provided in said track adapted to receive said rolling means in the closed position of said door whereby said door is frictionally supported by said track, said door being capable of uninterrupted movement upon said rolling means to full open position to completely expose the door opening controlled by said door.

3. In a railway house car having a door opening, a door, a track, spaced rolling means disposed upon said track capable of longitudinal movement relative to said door for supporting said door for movement upon said track, spaced indentures provided in said track adapted to receive said rolling means in the closed position of said door whereby said door is frictionally supported by said track, the rearwardly positioned indenture being adapted to receive the rearwardly disposed rolling means but being incapable of receiving the forwardly disposed rolling means whereby said door may have unimpeded movement upon said track to full open position to completely expose said door opening.

4. In a railway house car having a door opening, a door, a track, spaced rolling means disposed upon said track capable of movement relative to said door for supporting said door for movement upon said track, said rolling means comprising a pair of balls remote from the rear edge of said door and a ball adjacent to said edge, spaced indentures provided in said track adapted to receive said balls in the closed position of said door whereby said door is frictionally supported by said track, the rearwardly positioned indenture being adapted to receive said one ball but being incapable of receiving said pair of balls whereby said door may have unimpeded movement upon said track to full open position to completely expose said door opening.

5. In combination, a door, a track, spaced rolling means disposed upon said track for longitudinal movement relative to said door and adapted to support said door for movement upon said track, a spacer movable with and maintaining said rolling means in spaced relation, said door being frictionally supported upon said track in closed position, means engaging said spacer and responsive to the opening movement of said door for disposing said rolling means in door engaging position, said door being capable of unimpeded travel upon said rolling means to full open position to completely expose the door opening controlled by said door.

6. In a railway house car having a door opening, a door, a track, spaced rolling means disposed upon said track capable of longitudinal movement relative to said door for supporting said door for movement upon said track, spaced indentures provided in said track adapted to receive said rolling means in the closed position of said door whereby said door is frictionally supported by said track, the rearwardly positioned indenture being adapted to receive the rearwardly disposed rolling means but being incapable of receiving the forwardly disposed rolling means whereby said door may have unimpeded movement upon said track to full open position to completely expose said door opening, and means responsive to the opening movement of said door for moving said rolling means relative to said indentures and into door engaging position.

7. In combination, a door, a track, spaced rolling means disposed upon said track and movable longitudinally relative to said door for supporting said door for movement upon said track, a spacer movable with and maintaining said rolling means in spaced relation, spaced indentures provided in said track adapted to receive said rolling means in the closed position of said door whereby said door is frictionally supported upon said track and means carried by said door having engagement with said spacer and operative in the opening movement of said door for imparting movement to said spacer and rolling means for moving said balls relative to said indentures and into door engaging position, said door having unimpeded movement upon said rolling means to full open position to completely expose the door opening controlled by said door.

8. In combination, a door, a track, spaced rolling means disposed upon said track and movable longitudinally relative to said door for supporting said door for movement upon said track, a spacer carried by and maintaining said rolling means in spaced relation, spaced indentures provided in said track adapted to receive said rolling means in the closed position of said door whereby said door is frictionally supported upon said track and means pivotally carried by said door having engagement with said spacer and operative in the opening movement of said door for imparting movement to said spacer and rolling means for moving said balls relative to said indentures and into door engaging position, said door having unimpeded movement upon said rolling means to full open position to completely expose the door opening controlled by said door.

9. In combination, a door, a track, spaced rolling means disposed upon said track and movable longitudinally relative to said door for supporting said door for movement upon said track, a spacer disposed upon said track and maintaining said rolling means in spaced relation, spaced indentures provided in said track adapted to receive said rolling means in the closed position of said door whereby said door is frictionally supported upon said track and means carried by said door having engagement with said spacer and operative in the opening movement of said door for imparting movement to said spacer and rolling means for moving said balls relative to said indentures and into door engaging position, said door having unimpeded movement upon said rolling means to full open position to completely expose the door opening controlled by said door.

10. In a railway freight car having a door opening, a door therefor, a track rolling means supporting said door for movement upon said track, said door being frictionally supported upon said track in full open position and means pivotally supported upon said car adapted to dispose said door upon said rolling means for movement to closed position, said means being actuated to operative position by said door in the opening movement thereof.

11. In a railway freight car having a door opening, a door therefor, a longitudinally extending member secured to a horizontal margin of said door, a track member, spaced rolling means having peripheral engagement with said members for supporting said door for movement upon said car, said longitudinally extending member being deformed adjacent the ends thereof, said track member being deformed at spaced points intermediate the vertical edges of said door in the closed position and in the full open position thereof, said rolling means being received in certain of said deformations in the closed position of said door and in the other of said deformations in the full open position of said door for the purpose set forth.

12. In a railway freight car having a door opening, a door therefor, a longitudinally extending member secured to a horizontal margin of said door, a track member, spaced rolling means having peripheral engagement with said members for supporting said door for movement upon said car, said longitudinally extending member being deformed adjacent the ends thereof, to provide portions inclined upwardly toward the front and rear vertical edges of said door, respectively, said track member having indentures at spaced points intermediate the vertical edges of said door in the closed position and in the full open position thereof, said rolling means being received in one of the deformed ends adjacent to an inclined portion and in one of said indentures in the closed position of the door and in the other deformed end adjacent to the other inclined portion and the other indenture in the full open position of said door for the purpose set forth.

13. In a railway freight car having a door opening, a door therefor, a longitudinally extending member secured to a horizontal margin of said door, a track member, spaced rolling means having peripheral engagement with said members for supporting said door for movement upon said car, a spacer for maintaining said rolling means in spaced relation, said longitudinally extending member being deformed adjacent the ends thereof to provide portions inclined upwardly toward the front and rear vertical edges of said door, respectively, said track member having indentures at spaced points intermediate the vertical edges of said door in the closed position and in the full open position thereof, said rolling means being received in one of the deformed ends adjacent to an inclined portion and in one of said indentures in the closed position of the door and in the other deformed end adjacent to the other inclined portion and the other indenture in the full open position of said door for the purpose set forth.

14. In a railway house car having a door opening, a door therefor, a track, spaced rolling means having peripheral engagement with said door and said track for supporting said door for movement upon said car, a spacer for maintaining said rolling means in spaced relation, said door being deformed adjacent to the vertical edges thereof and intermediate said edges, said rolling means being received in said deformations in full open and closed positions of said door whereby the latter is frictionally supported upon said track and means for disposing said rolling means in supporting relationship with said door.

15. In a railway house car having a door opening, a door therefor, a track, spaced rolling means having peripheral engagement with said door and said track for supporting said door for movement upon said car, a spacer for maintaining said rolling means in spaced relation, said door being deformed adjacent to the vertical edges thereof and intermediate said edges, said rolling means being received in said deformations in full open and closed positions of said door, whereby the latter is frictionally supported upon said track and a lever pivotally carried by said door for actuating said spacer to dispose said rolling means in supporting relationship with said door.

16. In a railway house car having a door opening, a door therefor, spaced members presenting downwardly disposed flanges secured to a horizontal margin of said door, the remote ends of said members being spaced inwardly from the vertical edges of said door, a track, spaced balls having peripheral engagement with said flanges and said track for supporting said door for movement upon said car, a spacer for maintaining said balls in spaced relation, said balls being received in the appropriate pockets provided by the spacing of said members in full open and closed positions of said door whereby the latter is frictionally supported upon said track and lever means for actuating said spacer to dispose said balls in supporting relationship with said door.

17. In combination, a door, a track, spaced rolling means disposed upon said track and movable longitudinally relative to said door for supporting said door for movement upon said track, a spacer movable with and maintaining said rolling means in spaced relation, spaced indentures provided in said track adapted to receive said rolling means in the closed position of said door whereby said door is frictionally supported upon said track, said door being provided with means disposed in engagement with said spacer when said rolling means are in said indentures, said means in the initial opening movement of said door imparting movement to said spacer and rolling means for moving said rolling means out of said indentures and into door supporting position.

18. In combination, a door, a track, spaced rolling means disposed upon said track for longitudinal movement relative to said door and adapted to support said door for movement upon said track, said door being frictionally supported upon said track in closed position, and means operatively connecting said door and said rolling means in the closed position of said door, whereby said door in its initial opening movement will impart movement to said rolling means to dispose the same in door supporting position.

19. In combination, a door, a track, spaced rolling means disposed upon said track for longitudinal movement relative to said door and adapted to support said door for movement upon said track, said door being frictionally supported upon said track in closed position, and means operatively connecting said door and said rolling means in the closed position of said door, whereby said door in its initial opening movement will impart movement to said rolling means to dispose the same in door supporting position, said connecting means being automatically disengaged during said initial movement of the door for the purpose set forth.

20. In combination, a door, a track, spaced rolling means disposed upon said track for longitudinal movement relative to said door and adapted to support said door for movement upon said track, said door being frictionally supported upon said track in closed position, and means operatively connecting said door and said rolling means in the closed position of said door, whereby said door in its initial opening movement will impart movement to said rolling means to dispose the same in door supporting position, said connecting means being automatically disengaged during said initial movement of the door and being automatically engaged during the final closing movement of said door for the purpose set forth.

21. In combination, a door, a track, spaced balls disposed upon said track for longitudinal movement relative to said door and adapted to support said door for travel upon said track, spaced indentures provided in said track adapted to receive said balls in the closed position of said door whereby said door is frictionally supported by said track, and means operatively connecting said door and said balls in the closed position of said door, whereby said door in its initial opening movement will impart movement to said balls out of said indentures to dispose the same in door supporting position.

22. In combination, a door, a track, spaced balls disposed upon said track for longitudinal movement relative to said door and adapted to support said door for travel upon said track, spaced indentures provided in said track adapted to receive said balls in the closed position of said door whereby said door is frictionally supported by said track, and means operatively connecting said door and said balls in the closed position of said door, whereby said door in its initial opening movement will impart movement to said balls out of said indentures to dispose the same in door supporting position, said connecting means being automatically disengaged during said initial movement of said door.

23. In combination, a door, a track, spaced balls disposed upon said track for longitudinal movement relative to said door and adapted to support said door for travel upon said track, spaced indentures provided in said track adapted to receive said balls in the closed position of said door whereby said door is frictionally supported by said track, and means operatively connecting said door and said balls in the closed position of said door, whereby said door in its initial opening movement will impart movement to said balls out of said indentures to dispose the same in door supporting position, said connecting means being automatically disengaged during said initial movement of said door, and being automatically engaged during the final closing movement of said door for the purpose set forth.

24. In combination, a door, a track, spaced rolling means disposed upon said track and movable longitudinally relative to said door for supporting said door for movement upon said track, a spacer movable with and maintaining said rolling means in spaced relation, spaced indentures provided in said track adapted to receive said rolling means in the closed position of said door whereby said door is frictionally supported upon said track, said door being provided with means disposed in engagement with said spacer when said rolling means are in said indentures, said means in the initial opening movement of said door imparting movement to said spacer and rolling means for moving said rolling means out of said indentures and into door supporting position, said spacer engaging means being automatically released from said spacer during the initial opening movement of said door.

25. In a railway freight car having a door opening, a door therefor having the normal width corresponding to the door opening controlled by said door, a track, spaced rolling means having peripheral rolling engagement with said door and said track for supporting said door upon said track during the travel thereof, said rolling means being disposed intermediate the vertical edges of said door during the full movement of said door, said door and said track being deformed, said rolling means being received in said deformations in the closed and full open positions of said door, whereby said door is frictionally supported upon said track in said positions, said deformations and rolling means having association whereby said door will have uninterrupted movement upon said rolling means to full open position to fully expose said door opening.

26. In combination, a door, a track, spaced rolling means disposed upon said track for longitudinal movement relative to said door and adapted to support said door for movement upon said track, a spacer movable with and maintaining said rolling means in spaced relation, said door being frictionally supported upon said track in closed position, means engaging said spacer and responsive to the opening movement of said door for disposing said rolling means in door engaging position, said door being capable of antifrictional movement upon said rolling means.

27. In a railway house car having a door opening, a door therefor, a track, spaced rolling means having peripheral engagement with said door and said track for supporting said door for movement upon said track, said door being provided with recesses, said rolling means being received in said recesses whereby said door is frictionally supported upon said track and means for elevating said door for support upon said rolling means, said elevating means comprising a manually operable lever pivotally mounted on said door and a member movable by said lever.

28. In a railway house car having a door opening, a door therefor, a track, spaced balls having peripheral engagement with said door and said track for supporting said door for movement upon said track, said door being provided with recesses, said balls being received in said recesses whereby said door is frictionally supported upon said track and means for elevating said door for support upon said balls, said elevating means comprising a manually operable lever pivotally mounted on said door and a member movable by said lever.

29. In a railway house car having a door opening, a door therefor, a track, spaced rolling means having peripheral engagement with said door and said track for supporting said door for movement upon said track, said door being provided with recesses, said rolling means being received in said recesses whereby said door is frictionally supported upon said track and means for elevating said door for support upon said rolling means, said elevating means comprising a lever pivoted to said door and a member movable by said lever and cooperable with said rolling means.

30. In a railway house car having a door opening, a door therefor, a track, spaced balls having peripheral engagement with said door and said track for supporting said door for movement upon said track, said door being provided with recesses, said balls being received in said recesses whereby said door is frictonally supported upon said track and means for elevating said door for support upon said balls, said elevating means comprising a lever pivoted to said door and a member movable by said lever and cooperable with said balls.

31. In a railway house car having a door opening, a door having a track, a supporting track for said door, spaced rolling means having peripheral engagement with said door track and said supporting track for supporting said door for movement upon said latter track, said door track having recesses, said rolling means being received in said recesses whereby said door is frictionally supported upon said supporting track and a manually operable lever pivotally mounted on said door and operatively associated with said rolling means for elevating said door for support upon said rolling means.

32. In combination, a doorway and a sliding door having bearing tracks, anti-friction bearings between said tracks, there being recesses in said door track for receiving said bearings to render the same inoperative, sliding of said door being frictionally resisted when said bearings are in said recesses, and a member on said door to be grasped by the hand of an operator to open said door and mechanism operated automatically by door opening movement of said member for elevating said door track independently of the sliding movement of said door to avoid said resistance and render said bearings operative.

33. In combination, a doorway having a bearing track, a sliding door having a bearing engaging track, an anti-friction bearing for supporting said door track on said doorway track, there being a recess in said door track for receiving said bearing to lower said door onto said doorway to render said bearing inoperative, and a leverage device for elevating said door independently of sliding movement thereof to render said bearing operative.

KENNETH J. TOBIN.
THORVALD MADLAND.